P. TYRER.
Cork-Extractor.

No. 199,760. Patented Jan. 29, 1878.

WITNESSES:
Theodore S. West,
Mamie D. Stallings

INVENTOR:
PETER TYRER
BY H. W. Beadle & Co.
ATTYS.

UNITED STATES PATENT OFFICE.

PETER TYRER, OF MELBOURNE, COLONY OF VICTORIA.

IMPROVEMENT IN CORK-EXTRACTORS.

Specification forming part of Letters Patent No. 199,760, dated January 29, 1878; application filed May 9, 1877.

*To all whom it may concern:*

Be it known that I, PETER TYRER, of No. 425 King street, Melbourne, in the Colony of Victoria, engine-driver, have invented an Improved Apparatus for Extracting Corks from Bottles, of which the following is a specification:

This invention is a cork-extractor of simple and inexpensive construction, as will be fully described hereinafter.

Figure 1:
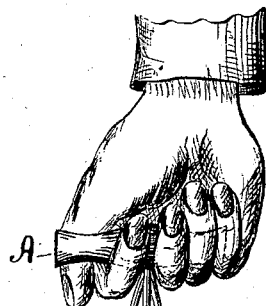
Figure 2:
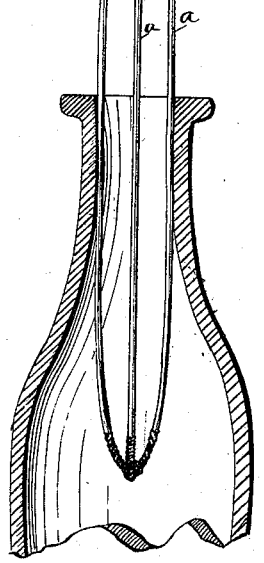
Figure 3:
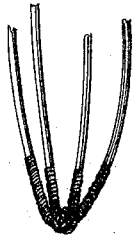
Figure 4:
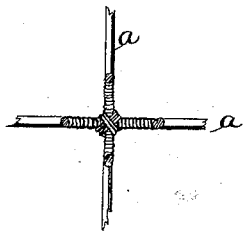

In the drawings, Figure 1 represents the extractor complete inserted into a bottle; Fig. 2, a partial sectional elevation, representing the manner of taking the cork; Figs. 3 and 4, views of the bottom portion detached.

To enable others skilled in the art to make and use my invention, I will now proceed to describe fully its construction and manner of operation.

*a a* represent independent wires, either flat or round, of equal length, which are arranged at right angles to each other and united at their centers, as shown in Fig. 4. If desired, they may be simply soldered at this point; or they may be soldered and then wrapped with wire, as shown in Figs. 3 and 4. The ends of these wires, after their centers have been united, are brought together, as shown in Fig. 1, and thrust through a proper opening in the handle-rod A, as shown, in which position they are secured by a wedge or other suitable means.

By these means a very simple and cheap device is obtained which is well adapted for the purpose for which it is designed.

Having thus fully described my invention, what I claim as new, and desire to secure by Letters Patent, is—

The independent wires *a a*, united at their centers at right angles to each other, and having their ends passed through the handle-rod A, in combination with the handle, as described.

PETER TYRER.

Witnesses:
EDWARD WATERS,
W. S. BAYSTON.